(12) United States Patent
Kulkarni et al.

(10) Patent No.: US 12,517,561 B2
(45) Date of Patent: Jan. 6, 2026

(54) HEAT PIPE DRYOUT PREVENTION

(71) Applicant: Intel Corporation, Santa Clara, CA (US)

(72) Inventors: Shantanu Kulkarni, Hillsboro, OR (US); Christopher Moore, Warren, OR (US); Jose Diaz Marin, San Jose (CR); Mark MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 17/889,719

(22) Filed: Aug. 17, 2022

(65) Prior Publication Data
US 2022/0390995 A1    Dec. 8, 2022

(51) Int. Cl.
*G06F 1/20* (2006.01)
*H05K 7/20* (2006.01)

(52) U.S. Cl.
CPC ......... *G06F 1/206* (2013.01); *H05K 7/20336* (2013.01); *H05K 7/20381* (2013.01)

(58) Field of Classification Search
CPC .................................................. G06F 1/206
See application file for complete search history.

(56) References Cited

U.S. PATENT DOCUMENTS

| | | | | |
|---|---|---|---|---|
| 2006/0101831 | A1* | 5/2006 | Storm | E21B 47/0175 165/104.21 |
| 2010/0155033 | A1* | 6/2010 | Holley | F28D 15/046 29/890.03 |
| 2013/0000871 | A1* | 1/2013 | Olson | H05K 7/20336 713/300 |
| 2018/0324979 | A1* | 11/2018 | North | G06F 1/20 |
| 2021/0095931 | A1* | 4/2021 | Bortolato | H01L 23/427 |

FOREIGN PATENT DOCUMENTS

| | | | | |
|---|---|---|---|---|
| CN | 210165523 U | * | 3/2020 | |
| CN | 110989803 A | * | 4/2020 | G06F 1/203 |

* cited by examiner

*Primary Examiner* — Suresh Suryawanshi
(74) *Attorney, Agent, or Firm* — Hanley, Flight & Zimmerman, LLC

(57) ABSTRACT

Methods, apparatus, systems, and articles of manufacture are disclosed that prevent heat pipe dryout. An example apparatus includes processor circuitry to at least one of instantiate or execute machine readable instructions to: determine if a temperature of a heat pipe of an electronic device is below a first threshold temperature; cause a program to switch from a first operating mode to a second operating mode when the temperature is below the first threshold temperature, the second operating mode to use more processor circuitry bandwidth than the first operating mode; determine at least one of (1) an occurrence of an increase in a power level of the electronic device or (2) the temperature of the heat pipe satisfies a second threshold temperature; and cause the program to switch from the second operating mode to the first operating mode based on at least one of (1) the occurrence of the increase in the power level or (2) the temperature of the heat pipe satisfying the second threshold temperature.

24 Claims, 6 Drawing Sheets

HEAT PIPE DRYOUT PREVENTION

FIELD OF THE DISCLOSURE

This disclosure relates generally to heat exchange devices in electronic devices and, more particularly, to heat pipe dry out prevention.

BACKGROUND

Heat pipes are included in electronic devices to transfer heat away from a heat generating source using an internal working fluid.

BRIEF DESCRIPTION OF THE DRAWINGS

In general, the same reference numbers will be used throughout the drawing(s) and accompanying written description to refer to the same or like parts. The figures are not to scale.

DETAILED DESCRIPTION

Figure 1:
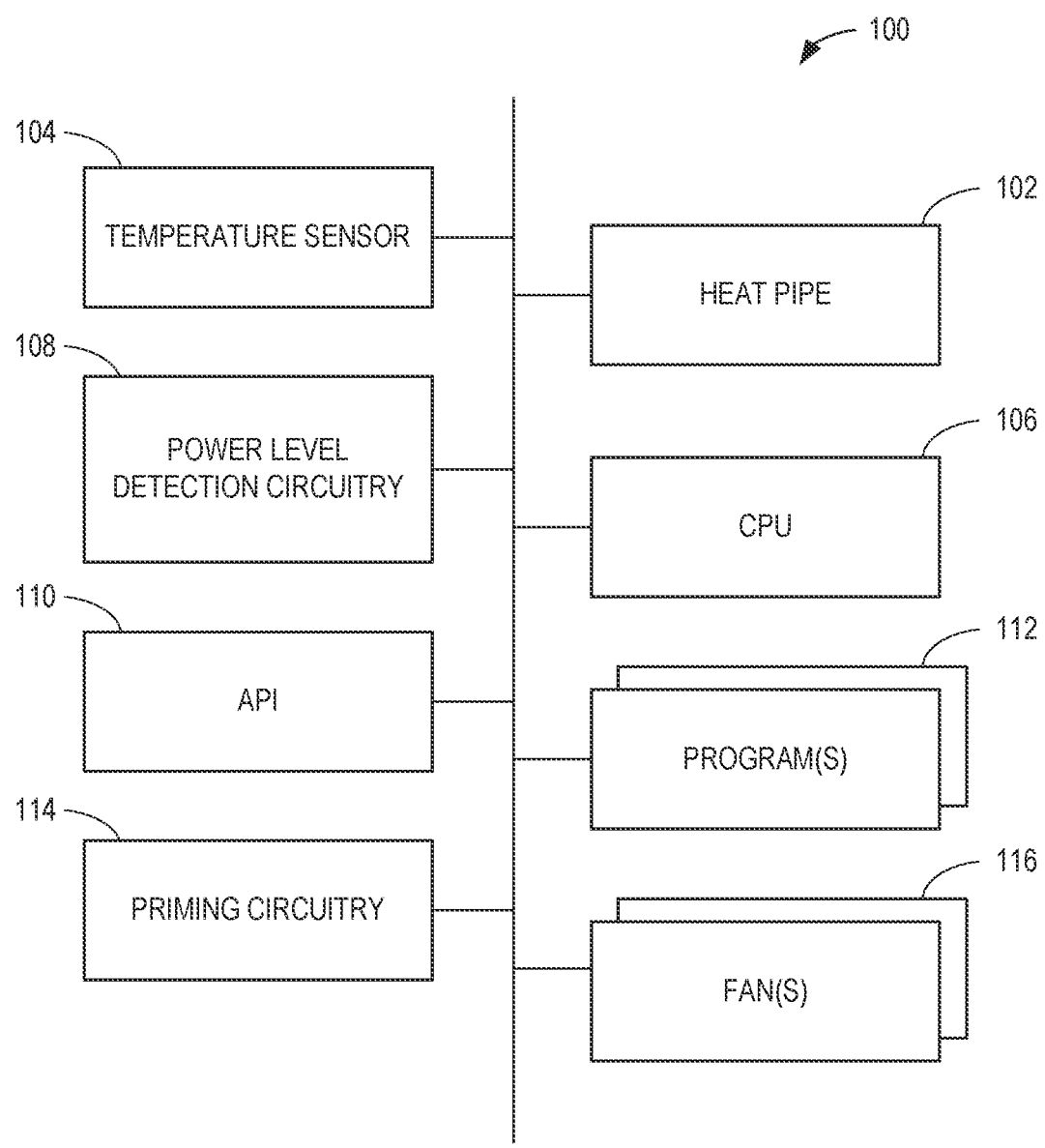
FIG. 1 is a block diagram of an example electronic device.

Electronic devices include thermal management techniques or solutions to dissipate heat from heat generating components to control the internal temperature of the electronic devices. Some thermal solutions include devices that incorporate two-phase components such as, for example, heat pipes and/or vapor chambers that include a substance in a liquid phase and a gas phase. A heat pipe includes a cavity containing a working fluid and a wick. Near the heat generating component, the working fluid changes phases by evaporating to vapor during operation of the electronic device, which absorbs thermal energy. The vapor flows along the cavity away from the higher temperature end of the heat pipe (the evaporator) near the heat generating component to a lower temperature end of the heat pipe (the condenser). At the lower temperature end of the heat pipe, the vapor changes phases again by condensing back to working fluid that is absorbed by the wick, which releases thermal energy. Capillary action of the wick pulls the condensed working fluid back to the higher temperature end of the heat pipe.

The maximum heat load or capillary limit that can be sustained at steady state in a heat pipe is based on the capillary pressure provided by the wick in the heat pipe and the flow resistance to liquid resupply at the evaporator. The flow resistance may be based on liquid viscosity and the vapor pressure in the heat pipe. Operation at steady heat loads above the capillary limit impedes fluid flow through the wick, resulting in lower flow and eventually in dryout at the wick. Dryout occurs when the fluid flow from the condenser through the wick ceases or substantially ceases. The heat transfer capabilities of a heat pipe deteriorate rapidly with dryout. A heat pipe experiencing dryout effectively acts as an insulator causing component overheating.

Because heat pipes rely on the phase change of the working fluid and the capillary action of the wick, heat pipes have better performance when operating at a higher temperature. At a higher temperature the working fluid has a lower viscosity, which enables the working fluid to return at a higher rate to the evaporator. Thus, if an initial temperature of heat pipe is higher, working fluid viscosity is lower and the heat pipe is less likely to dryout when heat is added such as, for example, during a state of increased power consumption like a turbo boost or other higher performance operating state. In some examples, a higher initial temperature in the area joining evaporator and condenser improves performance of the heat pipe.

As used herein a "heat pipe" is a heat transfer device that transfers heat from a heat source in an electronic device to an exterior of the electronic device via a working fluid. The term heat pipe is meant to encompass all types of such heat transfer devices including, for example, constant conductance heat pipes, vapor chambers (planar or flat heat pipes), variable conductance heat pipes, pressure controlled heat pipes, diode heat pipes, thermosyphons, rotating heat pipes, etc.

As used herein, a "background process" is a computer process that runs in the background without user intervention. Some example tasks for background processes include, for example, updating, logging, virus scanning, system monitoring, scheduling, and/or user notification.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

FIG. 1 is a block diagram of an example electronic device 100. The electronic device 100 includes an example heat pipe 102, an example temperature sensor 104, an example CPU 106, example power level detection circuitry 108, an example API 110, one or more example program(s) 112, example priming circuitry 114, and one or more example fan(s) 116.

The priming circuitry 114 implements an intelligent CPU workload to increase the temperature of the heat pipe 102 using waste heat from the CPU 106 to prime the heat pipe 102 to an initial temperature (a primed temperature), which enables the heat pipe 102 to operate with enhanced performance to prevent heat pipe dryout when the CPU 106 needs to operate at higher powers. For example, the priming circuitry 114 implements a priming workload, which causes the CPU 106 to execute one or more programs. Operation of the CPU 106 to execute the one or more programs generates heat. The heat generated by the CPU 106 is used to prime the heat pipe 102. The priming circuitry 114 may further control speed of the fans 116 to control the temperature of the heat pipe 102.

The power level detection circuitry 108 detects a power level of the electronic device 100 including, for example, a power level of the CPU 106. The priming circuitry 114 determines if the power level of the CPU 106 indicates that the CPU is idle. If the CPU 106 is not idle, the priming circuitry 114 does not implement the priming workload because operation of the CPU 106 will prime the heat pipe 102. In some examples, if the CPU 106 is idle, the priming circuitry 114 implements the priming workload to warm the heat pipe 102. In some examples, the priming circuitry 114 implements or does not implement the priming workload based on the data from the temperature sensor 104 without regard to the power level of the CPU 106.

As explained further herein, the priming workload is an algorithm for execution or implementation of one of more programs to cause an increase in power consumption by the CPU 106 and/or of control of fan speeds to generate heat to increase the initial temperature of the heat pipe 102.

The temperature sensor 104 detects the temperature of the heat pipe 102. The priming circuitry 114 determines if the temperature of the heat pipe 102 is below a first threshold temperature. In some examples, the first threshold temperature is a low temperature threshold. In some examples, the low threshold temperature is a lower limit of the initial heat pipe temperature that will result in a dryout response to an increased power level event (an operating state of the electronic device 100 with increased power level consumption). The dryout response results in a higher junction temperature and lower overall performance of the electronic device 100. In some examples, the lower temperature threshold is 30 degrees Celsius or about 30 degrees Celsius. If the temperature of the heat pipe 102 is not below the first threshold temperature, the priming circuitry 114 does not implement a priming workload.

If the temperature of the heat pipe 102 is below the first threshold temperature, the priming circuitry 114 implements the priming workload. For example, the priming circuitry 114 causes the API 110 to initiate execution of one or more programs 112. The execution of the programs 112 causes the CPU 106 to operate at an increased power level, which results in the generation of heat. The heat generated by the CPU 106 causes the temperature of the heat pipe 102 to rise above the first threshold temperature. In some examples, the priming workload causes a program to switch from a first operating mode to a second operating mode, the second operating mode to use more processor circuitry or CPU 106 bandwidth than the first operating mode. In some examples, the priming workload causes a program to increase processor circuitry bandwidth or CPU bandwidth consumption when the temperature is below the first threshold temperature.

In some examples, priming workload indicates that more than one program 112 is to operate simultaneously or at least partially simultaneously. In some examples, the priming workload indicates that more than one program 112 are to operate in sequence. In some examples, one or more of the programs 112 are selected based on an amount of processing power needed to run the program 112. In some examples, one or more of the programs 112 are selected based on a power consumption of the programs 112 to achieve a temperature increase of the heat pipe 102 within a threshold amount of time. For example, the priming workload causes increased power consumption by the CPU 106. In some examples, a heat input of between 1 Watt (W) and 5 W can result in a thermal solution temperature increase of 5 degrees Celsius. As the input power varies (e.g., based on the selected programs 112), so does the time required to get a 5 degree Celsius incremental increase. Higher power leads to less time to increase the temperature of the heat pipe 102.

In some examples, one or more of the programs 112 are background processes of an operating system of the electronic device 100. For example, the program 112 may be a background task such as, for example, a system update, a virus scan, storage management, cool three-dimensional rendering, or other background processes of the electronic device 100. In some examples, the programs 112 that are background processes are not run during or immediately after initialization or powering on of the electronic device 100. Rather, in such examples, the programs 112 that are background processes are paused or otherwise held from running until the priming circuitry 114 implements the priming workload. In other words, the programs 112 that are background processes may be placed in a queue and executed when it is the right opportunistic time to warm the heat pipe 102. The right opportunistic time to warm the heat pipe 102 includes, for example, when the temperature of the heat pipe 102 is below the first threshold temperature. In some examples the background processes operate in a first mode that consumes a first amount of CPU 106 bandwidth and then operate in a second mode during the priming workload. In the second mode, the processes consumer a second amount of CPU 106 bandwidth greater than the first amount. The use of background processes for the programs 112 in the priming workload accomplishes two tasks at the same time. Specifically, the purpose of the background process is fulfilled and the temperature of the heat pipe 102 is increased.

In some examples, one of more of the programs 112 are a dummy or synthetic process independent of an operating system of the electronic device 100. For example, a synthetic process may be a program 112 run by the CPU 106 for the purpose of generating heat to warm the heat pipe 102 to a temperature above the first temperature threshold and not for other operational aspects of the electronic device 100. In some examples, the synthetic process may be part of a shared workload of a larger computational project. For example, the synthetic process may be a program or a portion of a program that has other functions (e.g., non-background functions) for the electronic device but may be run or re-run to help generate heat to prime the heat pipe 102.

The power level detection circuitry 108 continues to monitor power consumption in the electronic device 100. In addition, the temperature sensor 104 continues to monitor the temperature of the heat pipe 102. Thus, in some examples, there is feedback such as a closed feedback loop that monitors power levels and temperature. In some examples, the feedback is performed by Intel® Dynamic Tuning Technology, which includes system software drivers configured with artificial intelligence and machine learning based algorithms to dynamically optimize the system of the electronic device 100 for performance, battery life, and thermal solutions. In some examples, the priming circuitry 114 determines that an increase in a power level of the electronic device 100 has occurred and/or that the temperature of the heat pipe 102 satisfies a second threshold temperature. The priming circuitry 114 stops the priming workload, which causes the one or more programs 112 to stop based on one or both of: the occurrence of the increase in the power level and/or the temperature of the heat pipe satisfying the second threshold temperature. In some examples, stopping the priming workload causes the programs 112 to switch from the second operating mode to the first operating mode. In the first operating mode, less CPU 106 bandwidth is consumed than in the second operating mode.

In some examples, the second temperature threshold is a temperature higher than the first temperature threshold. The second temperature threshold is a higher initial temperature of the heat pipe 102 that primes the heat pipe 102 for an increased power level event. With the heat pipe 102 primed before the initiation of the increased power level event, the heat pipe 102 operates through the increased power level event without drying out.

In some examples, the first temperature threshold and the second temperature threshold are pre-characterized temperatures. In some examples, the second temperature threshold denotes a starting point temperature of the heat pipe 102 that avoids dryout for a target increased power level event and results in lower junction temperature and better performance of the electronic device 100. In a normal operation of the electronic device 100, because of different ongoing computing processes, initial starting temperature of the heat pipe 102 is above or close to the second temperature threshold. However, when there are no programs 112 running and the CPU 106 idles for longer time, the heat pipe 102 cools well below the second temperature threshold and reduces close to the first temperature threshold. As disclosed herein, the waste heat of the priming workload increases the temperature of the heat pipe 102 back to the second temperature threshold, which primes the heat pipe 102 for the next increased power level event. Once the temperature of heat pipe 102 reaches the second temperature threshold, the priming workload is stopped. The cycle repeats to keep the heat pipe 102 temperature close to the second temperature threshold to respond to the next increase power level event. Because the heat pipe 102 has a temperature close to the second temperature threshold, dryout is prevented during the increased power level event.

In some examples, the first temperature threshold and the second temperature threshold are based on a type of liquid in the heat pipe. In some examples, the first temperature threshold and the second temperature threshold are based on an amount of liquid in the heat pipe. In some examples, the first temperature threshold and the second temperature threshold differ by about 10 degrees Celsius. In some examples, the second temperature threshold is 40 degrees, and in some examples the second temperature threshold is about 40 degrees.

In some examples, the priming circuitry 114 selects a hierarchy of the programs 112 to run. The hierarchy may be selected based on the power level requirements of the programs 112 to avoid operating the CPU 106 at too high level but, rather, enough to increase the temperature of the heat pipe 102 from the first temperature threshold to the second temperature threshold within a particular time frame. In some examples, if a program 112 is running when the second temperature threshold is achieved, the program 112 may be stopped and placed in queue to be run during a subsequent implementation of the priming workload. For example, a program 112 for downloading updates may be paused once the second temperature threshold is reached. The downloading may resume during the next or a later implementation of the priming workload.

Additionally or alternatively, in some examples, the priming circuitry 114 controls the speed and/or operating state of one of more of the fans 116. For example, the fan 116 can be stopped or run at a slow speed when the CPU 106 operates at low powers to increase heat in the electronic device 100. Also, the priming circuitry 114 can adjust idle fan speed and/or fan ramping to have higher initial temperatures of the heat pipe 102. Smart fan control can also be used in conjunction with the workload of the CPU 106 to achieve the desired temperature of the heat pipe 102.

In some examples, the priming circuitry 114 is to cause a decrease in a speed of a fan when the temperature is below the first threshold temperature to increase heat in the electronic device 100. In some examples, the priming circuitry 114 is to cause an increase in the speed of the fan based on an occurrence of an increase in a power level of the CPU 106 and/or the temperature of the heat pipe 102 satisfying the second threshold temperature.

In some examples, the power level detection circuitry 108 is to detect a connection to an external power source. In some examples, the priming circuitry 114 implements the priming workload based on the connection to the external power source. Implementing the priming workload uses power resources to operate the CPU 106. Implementing the priming workload while the electronic device 100 is coupled to an external power source extends the battery life of the electronic device because internal power is preserved and not used to run the priming workload.

Examples disclosed herein discuss the power level and operating of the CPU 106. However, these examples equally apply to any processor, processing unit, microprocessor, or other electrical component or digital circuit that performs operations to run an electronic device including, for example, a graphics processing unit (GPU).

FIG. 1 is a block diagram of the electronic device 100 to prevent heat pipe dryout. The electronic device 100 of FIG. 1 may be instantiated (e.g., creating an instance of, bring into being for any length of time, materialize, implement, etc.) by processor circuitry such as a central processing unit executing instructions. Additionally or alternatively, the electronic device 100 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

Figure 2:
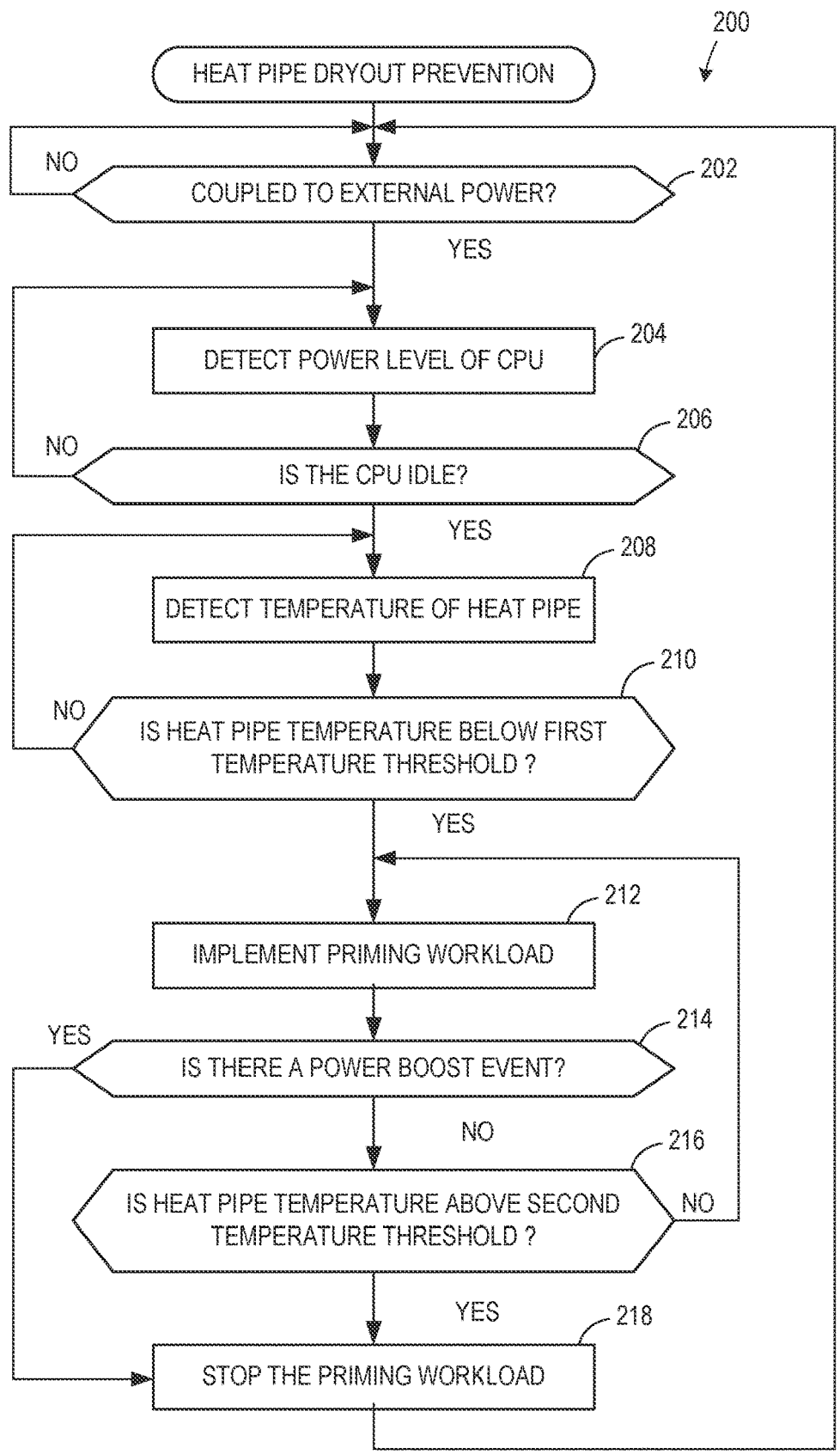
FIG. 2 is a flowchart representative of example machine readable instructions and/or example operations that may be executed by example processor circuitry to implement the electronic device of FIG. 1.

In some examples, the power level detection circuitry 108 is instantiated by processor circuitry executing power level detection instructions and/or operations such as those represented by the flowchart of FIG. 2.

In some examples, the priming circuitry 114 is instantiated by processor circuitry executing priming instructions and/or operations such as those represented by the flowchart of FIG. 2.

In some examples, the electronic device 100 includes means for determining a temperature of a heat pipe of an electronic device. For example, the means for determining a temperature may be implemented by the temperature sensor 104. In some examples, the electronic device 100 includes means for determining a power level of an electronic device. For example, the means for determining a power level may be implemented by the power level detection circuitry 108. In some examples, the electronic device 100 includes means for implementing a priming workload. For example, the means for implementing a priming workload may be implemented by the priming circuitry 114.

Figure 3:
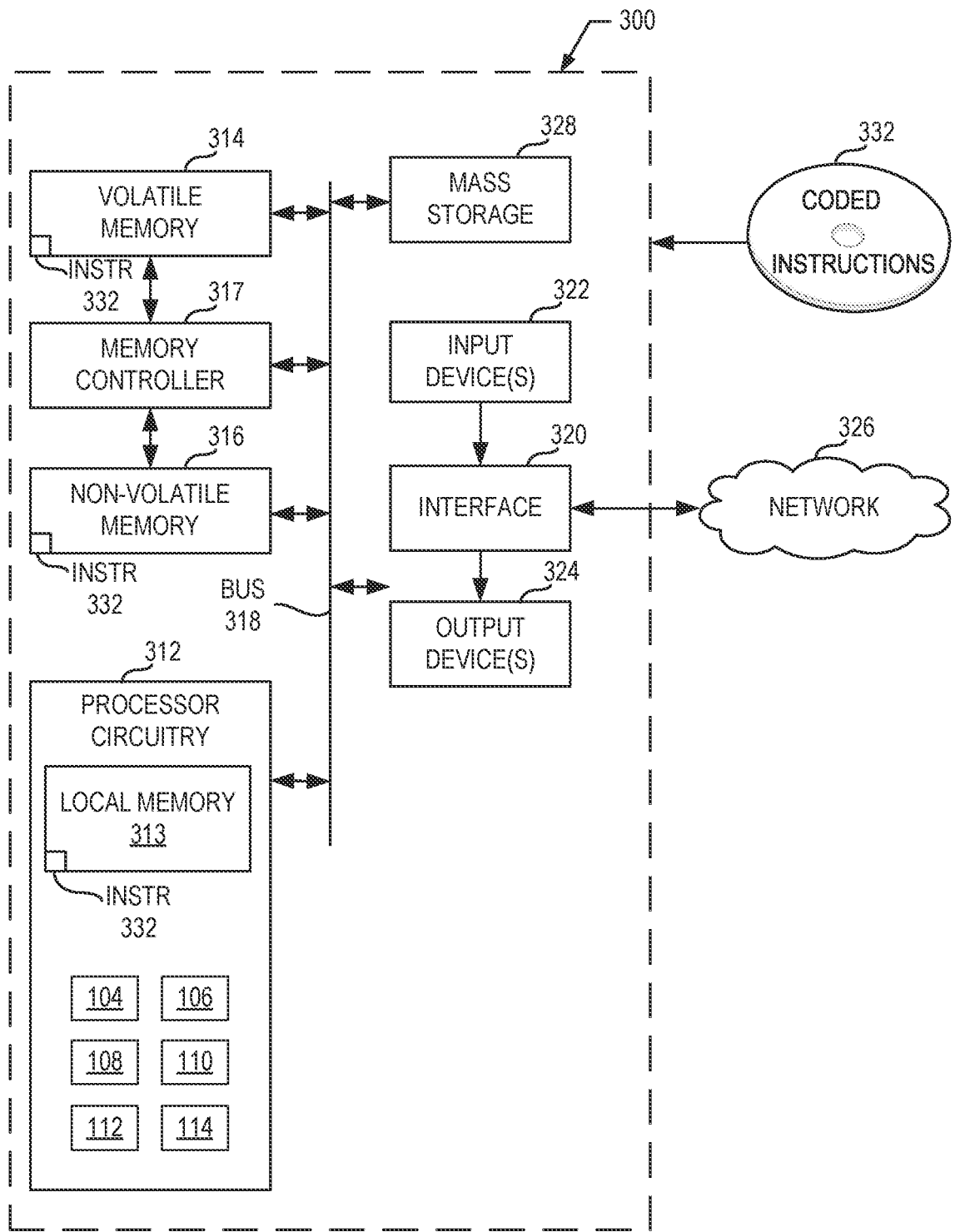
FIG. 3 is a block diagram of an example processing platform including processor circuitry structured to execute the example machine readable instructions and/or the example operations of FIG. 2 to implement the electronic device of FIG. 1.

In some examples, the temperature sensor 104, the power level detection circuitry 108 may be instantiated by processor circuitry such as the example processor circuitry 312 of FIG. 3. For instance, the temperature sensor 104 may be instantiated by the example microprocessor 300 of FIG. 3 executing machine executable instructions such as those implemented by at least block 208 of FIG. 2. In addition, the power level detection circuitry 108 may be instantiated by the example microprocessor 300 of FIG. 3 executing machine executable instructions such as those implemented by at least blocks 202, 204, 206, 214 of FIG. 2. In addition, the priming circuitry 108 may be instantiated by the example microprocessor 300 of FIG. 3 executing machine executable instructions such as those implemented by at least blocks 210, 212, 216, and 218 of FIG. 2.

Figure 4:
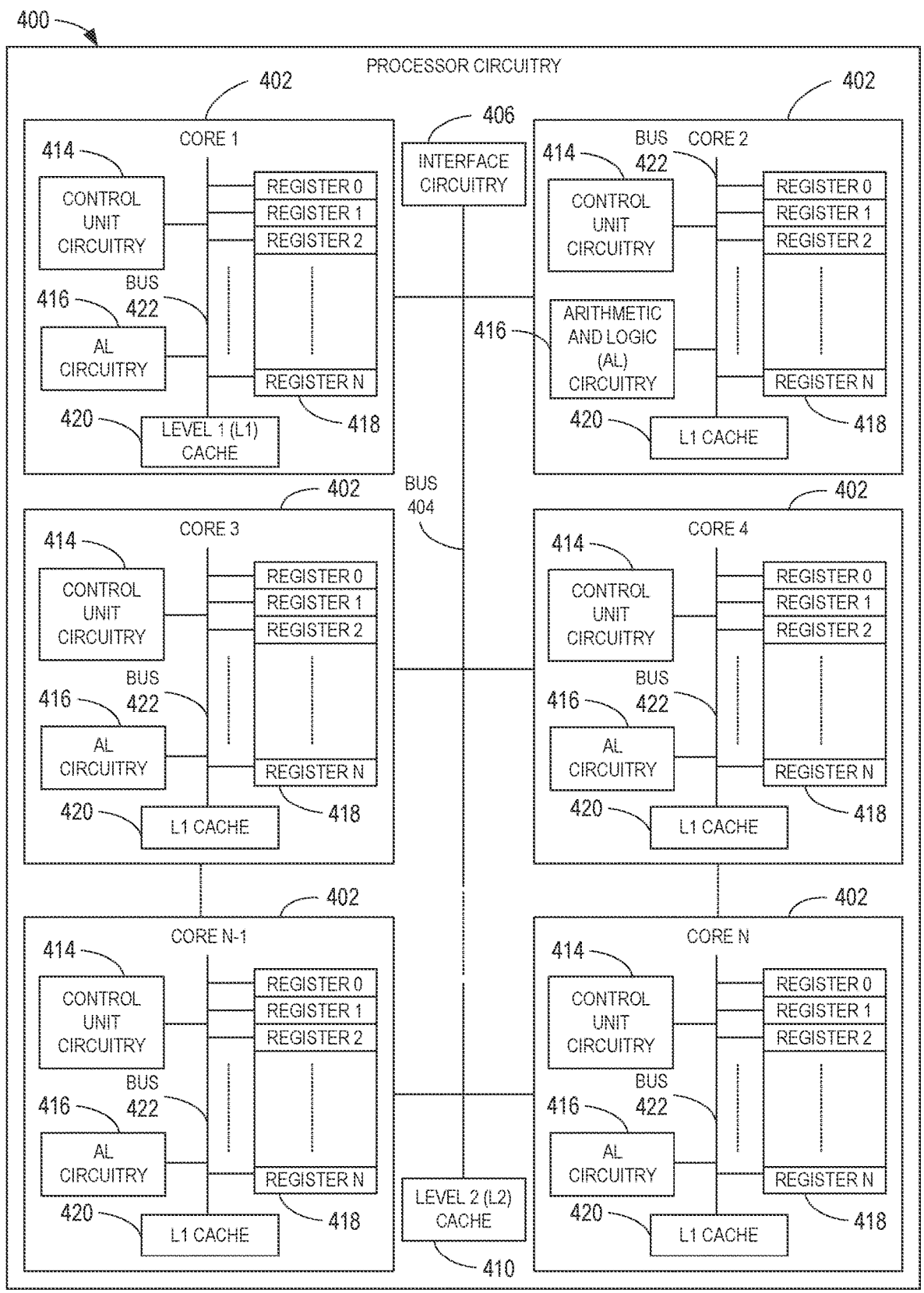
FIG. 4 is a block diagram of an example implementation of the processor circuitry of FIG. 3.

In some examples, the temperature sensor 104, the power level detection circuitry 108, and/or the priming circuitry 108 may be instantiated by hardware logic circuitry, which may be implemented by an ASIC, XPU, or the FPGA circuitry 400 of FIG. 4 structured to perform operations corresponding to the machine readable instructions. Additionally or alternatively, the temperature sensor 104, the power level detection circuitry 108, and/or the priming circuitry 108 may be instantiated by any other combination of hardware, software, and/or firmware. For example, the temperature sensor 104, the power level detection circuitry 108, and/or the priming circuitry 108 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the electronic device 100 is illustrated in FIG. 1, one or more of the elements, processes, and/or devices illustrated in FIG. 1 may be combined, divided, re-arranged, omitted, eliminated, and/or implemented in any other way. Further, the example temperature sensor 104, the example CPU 106, the example power level detection circuitry 108, the example API 110, the example program 112, and/or the example priming circuitry 114 of FIG. 1, may be implemented by hardware alone or by hardware in combination with software and/or firmware. Thus, for example, any of the example temperature sensor 104, the example CPU 106, the example power level detection circuitry 108, the example API 110, the example program 112, and/or the example priming circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example electronic device 100 of FIG. 1 may include one or more elements, processes, and/or devices in addition to, or instead of, those illustrated in FIG. 1, and/or may include more than one of any or all of the illustrated elements, processes and devices.

A flowchart representative of example machine readable instructions, which may be executed to configure processor circuitry to implement the electronic device 100 of FIG. 1, is shown in FIG. 2. The machine readable instructions may be one or more executable programs or portion(s) of an executable program for execution by processor circuitry, such as the processor circuitry 312 shown in the example processor platform 300 discussed below in connection with FIG. 3 and/or the example processor circuitry discussed below in connection with FIGS. 4 and/or 5. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 2, many other methods of implementing the example electronic device 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 2 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 2 is a flowchart representative of example machine readable instructions and/or example operations 200 that may be executed and/or instantiated by processor circuitry to prevent heat pipe dryout. The machine readable instructions and/or the operations 200 of FIG. 2 includes the power level detection circuitry 108 detecting a connection of the electronic device 100 to an external power source (block 202). If the power level detection circuitry 108 does not detect a connection to an external power source (block 202: NO), the operations 200 remain idle. If the power level detection circuitry 108 detects connection to an external power source (block 202: YES), the operations 200 proceed to block 204. In some examples, operations 200 proceed to block 204 even where an external power source is not detected (e.g., the electronic device 200 is operating on battery power).

The power level detection circuitry 108 detects a power level of the CPU 106 (block 204). The priming circuitry 114 determines if the CPU is idle (block 206). If the CPU 106 is not idle, the heat pipe 102 typically will not have a temperature below the first temperature threshold. If the CPU 106 is not idle (block 206: NO), the operations 200 continue with the power level detection circuitry 108 detecting a power level of the CPU 106 (block 204). In some examples, operations 200 proceed to block 206 even where the CPU 106 is not idle (e.g., the CPU 106 is operating, but further operation of the CPU could be used to warm the heat pipe 102 further).

If the CPU 106 is idle (block 206: YES), the operations 200 continue with the temperature sensor 104 detecting the temperature of the heat pipe 106 (block 208). In some examples, the priming circuitry 114 detects the temperature of the heat pipe 106 (block 208) based on data gathered from the temperature sensor 104. The priming circuitry 114 determines if the heat pipe temperature is below the first temperature threshold (block 210). If the heat pipe temperature is not below the first temperature threshold (block 210: NO), the operations 200 continue with the temperature sensor 104 and/or priming circuitry 114 detecting the temperature of the heat pipe 106 (block 208).

If the heat pipe temperature is below the first temperature threshold (block 210: YES), the operations 200 continue with the priming circuitry 114 implementing the priming workload (block 212). For example, the priming circuitry 114 causes the API 110 to execute one or more of the programs 112 to increase power consumption by the CPU 106. The increased power consumption by the CPU 106 generates heat that increases the temperature of the heat pipe 102.

The power detection circuitry 108 determines if there is a power boost event (block 214). In other words, the power detection circuitry 108 determines if there is increased power level consumption at the CPU 106. If the priming circuitry 114 determines that there is a power boost event (block 214: YES), the priming circuitry 114 stops the priming workload (block 218). With the power boost event, there is heat generated within the electronic device 100 that increases the temperature of the heat pipe 102 over the second temperature threshold.

If the priming circuitry 114 determines that there is no power boost event (block 214: NO), the priming circuitry 114 determines if the heat pipe temperature is above the second threshold temperature (block 216). If the heat pipe temperature is not above the second threshold temperature (block 216: NO), the operations 200 continue with the priming circuitry 114 implementing the priming workload (block 212).

If the heat pipe temperature is above the second threshold temperature (block 216: YES), the priming circuitry 114 stops the priming workload (block 218). At this point the heat pipe 102 is primed at the second threshold temperature and ready for an increased power level event (a power boost event) without risking dryout. After the priming circuitry 114 stops the priming workload (block 218), the operations 200 reset, and the power level detection circuitry 108 detects if the electronic device 100 is coupled to an external power source (block 202) in anticipation for a subsequent application of the priming workload.

FIG. 3 is a block diagram of an example processor platform 300 structured to execute and/or instantiate the machine readable instructions and/or the operations of FIG. 2 to implement the electronic device 100 of FIG. 1. The processor platform 300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 300 of the illustrated example includes processor circuitry 312. The processor circuitry 312 of the illustrated example is hardware. For example, the processor circuitry 312 can be implemented by one or more integrated circuits, logic circuits, FPGAs, microprocessors, CPUs, GPUs, DSPs, and/or microcontrollers from any desired family or manufacturer. The processor circuitry 312 may be implemented by one or more semiconductor based (e.g., silicon based) devices. In this example, the processor circuitry 312 implements the temperature sensor 104, the CUP 106, the power level detection circuitry 108, the API 110, the programs 112, and the priming circuitry 114.

The processor circuitry 312 of the illustrated example includes a local memory 313 (e.g., a cache, registers, etc.). The processor circuitry 312 of the illustrated example is in communication with a main memory including a volatile memory 314 and a non-volatile memory 316 by a bus 318. The volatile memory 314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 316 may be implemented by flash memory and/or any other desired type of memory device. Access to the main memory 314, 316 of the illustrated example is controlled by a memory controller 317.

The processor platform 300 of the illustrated example also includes interface circuitry 320. The interface circuitry 320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 322 are connected to the interface circuitry 320. The input device(s) 322 permit(s) a user to enter data and/or commands into the processor circuitry 312. The input device(s) 322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 324 are also connected to the interface circuitry 320 of the illustrated example. The output device(s) 324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 320 of the illustrated example, thus, typically includes a graphics driver card, a graphics driver chip, and/or graphics processor circuitry such as a GPU.

The interface circuitry 320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 300 of the illustrated example also includes one or more mass storage devices 328 to store software and/or data. Examples of such mass storage devices 328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 332, which may be implemented by the machine readable instructions of FIG. 2, may be stored in the mass storage device 328, in the volatile memory 314, in the non-volatile memory 316, and/or on a removable non-transitory computer readable storage medium such as a CD or DVD.

FIG. 4 is a block diagram of an example implementation of the processor circuitry 312 of FIG. 3. In this example, the processor circuitry 312 of FIG. 3 is implemented by a microprocessor 400. For example, the microprocessor 400 may be a general purpose microprocessor (e.g., general purpose microprocessor circuitry). The microprocessor 400 executes some or all of the machine readable instructions of the flowchart of FIG. _ to effectively instantiate the circuitry of FIG. 2 [er diagram] as logic circuits to perform the operations corresponding to those machine readable instructions. In some such examples, the circuitry of FIG. 2 [er diagram] is instantiated by the hardware circuits of the microprocessor 400 in combination with the instructions. For example, the microprocessor 400 may be implemented by multi-core hardware circuitry such as a CPU, a DSP, a GPU, an XPU, etc. Although it may include any number of example cores 402 (e.g., 1 core), the microprocessor 400 of this example is a multi-core semiconductor device including N cores. The cores 402 of the microprocessor 400 may operate independently or may cooperate to execute machine readable instructions. For example, machine code corresponding to a firmware program, an embedded software program, or a software program may be executed by one of the cores 402 or may be executed by multiple ones of the cores 402 at the same or different times. In some examples, the machine code corresponding to the firmware program, the embedded software program, or the software program is split into threads and executed in parallel by two or more of the cores 402. The software program may correspond to a portion or all of the machine readable instructions and/or operations represented by the flowchart of FIG.

The cores 402 may communicate by a first example bus 404. In some examples, the first bus 404 may be implemented by a communication bus to effectuate communication associated with one(s) of the cores 402. For example, the first bus 404 may be implemented by at least one of an Inter-Integrated Circuit (I2C) bus, a Serial Peripheral Interface (SPI) bus, a PCI bus, or a PCIe bus. Additionally or alternatively, the first bus 404 may be implemented by any other type of computing or electrical bus. The cores 402 may obtain data, instructions, and/or signals from one or more external devices by example interface circuitry 406. The cores 402 may output data, instructions, and/or signals to the one or more external devices by the interface circuitry 406. Although the cores 402 of this example include example local memory 420 (e.g., Level 1 (L1) cache that may be split into an L1 data cache and an L1 instruction cache), the microprocessor 400 also includes example shared memory 410 that may be shared by the cores (e.g., Level 2 (L2 cache)) for high-speed access to data and/or instructions. Data and/or instructions may be transferred (e.g., shared) by writing to and/or reading from the shared memory 410. The local memory 420 of each of the cores 402 and the shared memory 410 may be part of a hierarchy of storage devices including multiple levels of cache memory and the main memory (e.g., the main memory 314, 316 of FIG. 3). Typically, higher levels of memory in the hierarchy exhibit lower access time and have smaller storage capacity than lower levels of memory. Changes in the various levels of the cache hierarchy are managed (e.g., coordinated) by a cache coherency policy.

Figure 5:
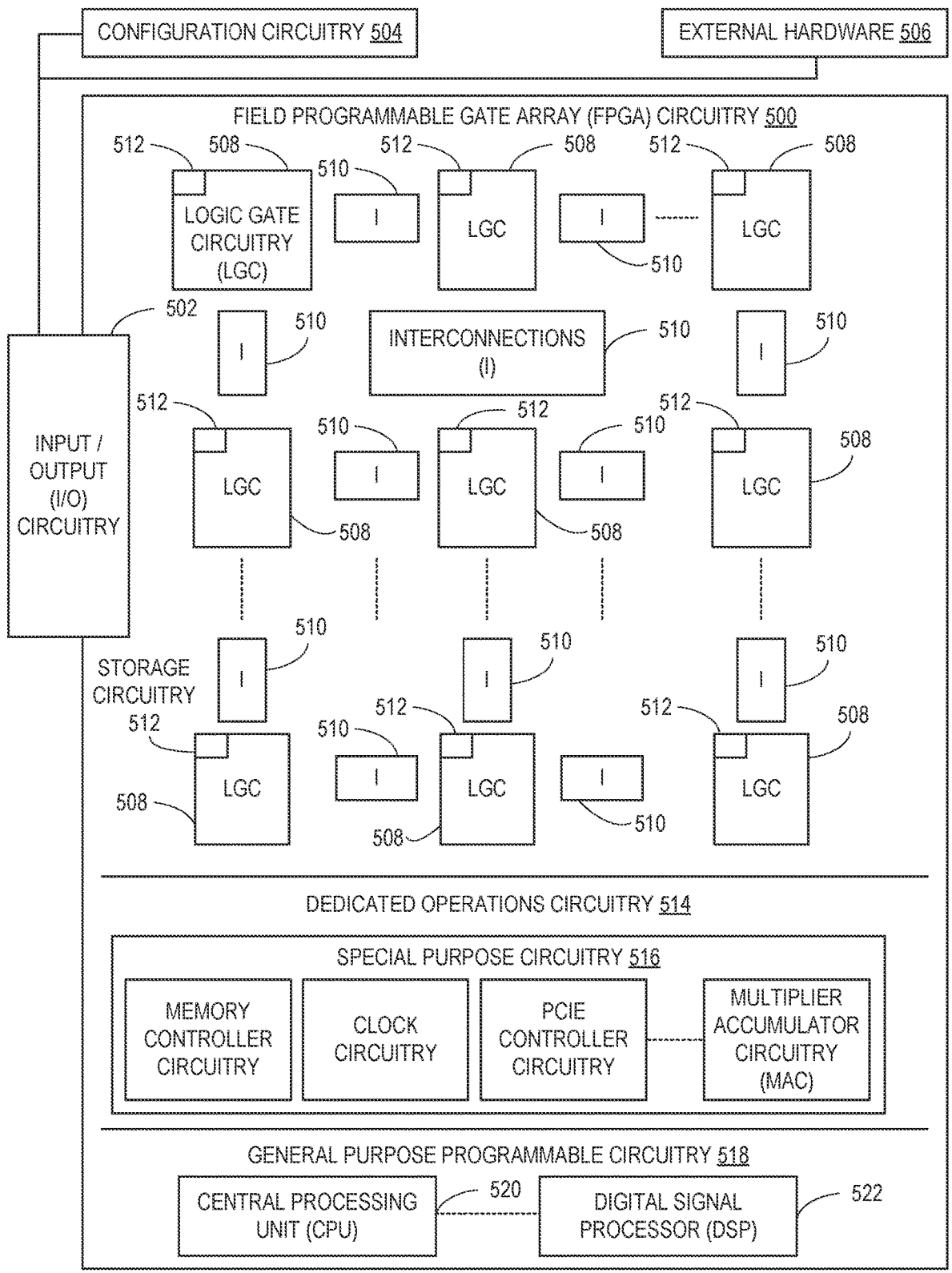
FIG. 5 is a block diagram of another example implementation of the processor circuitry of FIG. 3.

Each core 402 may be referred to as a CPU, DSP, GPU, etc., or any other type of hardware circuitry. Each core 402 includes control unit circuitry 414, arithmetic and logic (AL) circuitry (sometimes referred to as an ALU) 416, a plurality of registers 418, the local memory 420, and a second example bus 422. Other structures may be present. For example, each core 402 may include vector unit circuitry, single instruction multiple data (SIMD) unit circuitry, load/store unit (LSU) circuitry, branch/jump unit circuitry, floating-point unit (FPU) circuitry, etc. The control unit circuitry 414 includes semiconductor-based circuits structured to control (e.g., coordinate) data movement within the corresponding core 402. The AL circuitry 416 includes semiconductor-based circuits structured to perform one or more mathematic and/or logic operations on the data within the corresponding core 402. The AL circuitry 416 of some examples performs integer based operations. In other examples, the AL circuitry 416 also performs floating point operations. In yet other examples, the AL circuitry 416 may include first AL circuitry that performs integer based operations and second AL circuitry that performs floating point operations. In some examples, the AL circuitry 416 may be referred to as an Arithmetic Logic Unit (ALU). The registers 418 are semiconductor-based structures to store data and/or instructions such as results of one or more of the operations performed by the AL circuitry 416 of the corresponding core 402. For example, the registers 418 may include vector register(s), SIMD register(s), general purpose register(s), flag register(s), segment register(s), machine specific register(s), instruction pointer register(s), control register(s), debug register(s), memory management register(s), machine check register(s), etc. The registers 418 may be arranged in a bank as shown in FIG. 5. Alternatively, the registers 418 may be organized in any other arrangement, format, or structure including distributed throughout the core 402 to shorten access time. The second bus 422 may be implemented by at least one of an I2C bus, a SPI bus, a PCI bus, or a PCIe bus Each core 402 and/or, more generally, the microprocessor 400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 5 is a block diagram of another example implementation of the processor circuitry 312 of FIG. 3. In this example, the processor circuitry 312 is implemented by FPGA circuitry 500. For example, the FPGA circuitry 500 may be implemented by an FPGA. The FPGA circuitry 500 can be used, for example, to perform operations that could otherwise be performed by the example microprocessor 400 of FIG. 4 executing corresponding machine readable instructions. However, once configured, the FPGA circuitry 500 instantiates the machine readable instructions in hardware and, thus, can often execute the operations faster than they could be performed by a general purpose microprocessor executing the corresponding software.

More specifically, in contrast to the microprocessor 400 of FIG. 4 described above (which is a general purpose device that may be programmed to execute some or all of the machine readable instructions represented by the flowchart of FIG. 2 but whose interconnections and logic circuitry are fixed once fabricated), the FPGA circuitry 500 of the example of FIG. 5 includes interconnections and logic circuitry that may be configured and/or interconnected in different ways after fabrication to instantiate, for example, some or all of the machine readable instructions represented by the flowchart of FIG. 2. In particular, the FPGA circuitry 500 may be thought of as an array of logic gates, interconnections, and switches. The switches can be programmed to change how the logic gates are interconnected by the interconnections, effectively forming one or more dedicated logic circuits (unless and until the FPGA circuitry 500 is reprogrammed). The configured logic circuits enable the logic gates to cooperate in different ways to perform different operations on data received by input circuitry. Those operations may correspond to some or all of the software represented by the flowchart of FIG. 2. As such, the FPGA circuitry 500 may be structured to effectively instantiate some or all of the machine readable instructions of the flowchart of FIG. 2 as dedicated logic circuits to perform the operations corresponding to those software instructions in a dedicated manner analogous to an ASIC. Therefore, the FPGA circuitry 500 may perform the operations corresponding to the some or all of the machine readable instructions of FIG. 2 faster than the general purpose microprocessor can execute the same.

In the example of FIG. 5, the FPGA circuitry 500 is structured to be programmed (and/or reprogrammed one or more times) by an end user by a hardware description language (HDL) such as Verilog. The FPGA circuitry 500 of FIG. 5, includes example input/output (I/O) circuitry 502 to obtain and/or output data to/from example configuration circuitry 504 and/or external hardware 506. For example, the configuration circuitry 504 may be implemented by interface circuitry that may obtain machine readable instructions to configure the FPGA circuitry 500, or portion(s) thereof. In some such examples, the configuration circuitry 504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 506 may be implemented by external hardware circuitry. For example, the external hardware 506 may be implemented by the microprocessor 400 of FIG. 4. The FPGA circuitry 500 also includes an array of example logic gate circuitry 508, a plurality of example configurable interconnections 510, and example storage circuitry 512. The logic gate circuitry 508 and the configurable interconnections 510 are configurable to instantiate one or more operations that may correspond to at least some of the machine readable instructions of FIG. 2 and/or other desired operations. The logic gate circuitry 508 shown in FIG. 5 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 508 to enable configuration of the electrical structures and/or the logic gates to form circuits to perform desired operations. The logic gate circuitry 508 may include other electrical structures such as look-up tables (LUTs), registers (e.g., flip-flops or latches), multiplexers, etc.

The configurable interconnections 510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 508 to program desired logic circuits.

The storage circuitry 512 of the illustrated example is structured to store result(s) of the one or more of the operations performed by corresponding logic gates. The storage circuitry 512 may be implemented by registers or the like. In the illustrated example, the storage circuitry 512 is distributed amongst the logic gate circuitry 508 to facilitate access and increase execution speed.

The example FPGA circuitry 500 of FIG. 5 also includes example Dedicated Operations Circuitry 514. In this example, the Dedicated Operations Circuitry 514 includes special purpose circuitry 516 that may be invoked to implement commonly used functions to avoid the need to program those functions in the field. Examples of such special purpose circuitry 516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 500 may also include example general purpose programmable circuitry 518 such as an example CPU 520 and/or an example DSP 522. Other general purpose programmable circuitry 518 may additionally or alternatively be present such as a GPU, an XPU, etc., that can be programmed to perform other operations.

Although FIGS. 4 and 5 illustrate two example implementations of the processor circuitry 312 of FIG. 3, many other approaches are contemplated. For example, as mentioned above, modern FPGA circuitry may include an on-board CPU, such as one or more of the example CPU 520 of FIG. 5. Therefore, the processor circuitry 312 of FIG. 3 may additionally be implemented by combining the example microprocessor 500 of FIG. 5 and the example FPGA circuitry 500 of FIG. 5. In some such hybrid examples, a first portion of the machine readable instructions represented by the flowchart of FIG. 2 may be executed by one or more of the cores 502 of FIG. 5, a second portion of the machine readable instructions represented by the flowchart of FIG. 2 may be executed by the FPGA circuitry 500 of FIG. 5, and/or a third portion of the machine readable instructions represented by the flowchart of FIG. 2 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 312 of FIG. 3 may be in one or more packages. For example, the microprocessor 400 of FIG. 4 and/or the FPGA circuitry 500 of FIG. 5 may be in one or more packages. In some examples, an XPU may be implemented by the processor circuitry 312 of FIG. 3, which may be in one or more packages. For example, the XPU may include a CPU in one package, a DSP in another package, a GPU in yet another package, and an FPGA in still yet another package.

Figure 6:
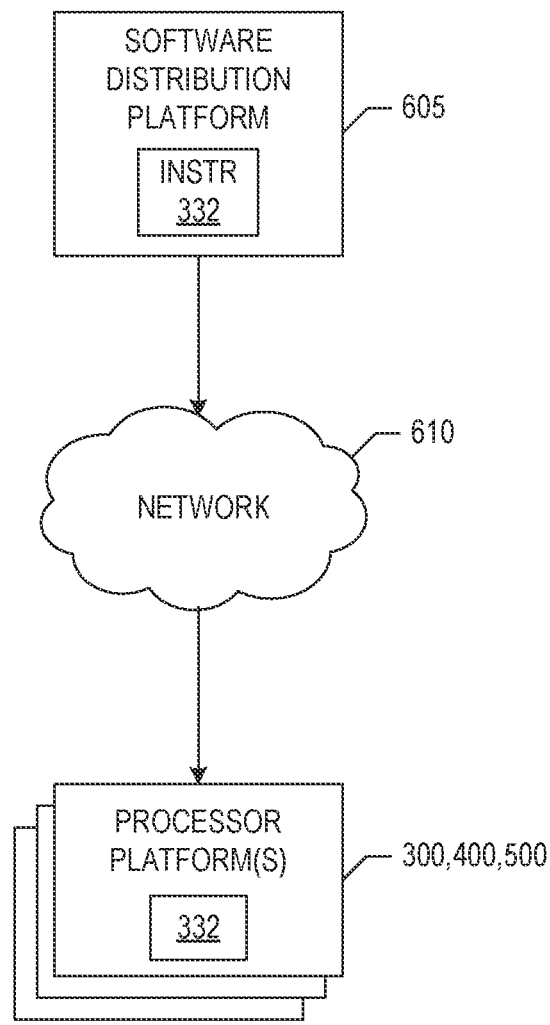
FIG. 6 is a block diagram of an example software distribution platform (e.g., one or more servers) to distribute software (e.g., software corresponding to the example machine readable instructions of FIG. 2 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 605 to distribute software such as the example machine readable instructions 332 of FIG. 3 to hardware devices owned and/or operated by third parties is illustrated in FIG. 6. The example software distribution platform 605 may be implemented by any computer server, data facility, cloud service, etc., capable of storing and transmitting software to other computing devices. The third parties may be customers of the entity owning and/or operating the software distribution platform 605. For example, the entity that owns and/or operates the software distribution platform 605 may be a developer, a seller, and/or a licensor of software such as the example machine readable instructions 332 of FIG. 3. The third parties may be consumers, users, retailers, OEMs, etc., who purchase and/or license the software for use and/or re-sale and/or sub-licensing. In the illustrated example, the software distribution platform 605 includes one or more servers and one or more storage devices. The storage devices store the machine readable instructions 332, which may correspond to the example machine readable instructions 200 of FIG. 2, as described above. The one or more servers of the example software distribution platform 605 are in communication with an example network 610, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 332 from the software distribution platform 605. For example, the software, which may correspond to the example machine readable instructions 200 of FIG. 2, may be downloaded to the example processor platform 300, which is to execute the machine readable instructions to implement the heat pipe dryout prevention. In some examples, one or more servers of the software distribution platform 605 periodically offer, transmit, and/or force updates to the software (e.g., the example machine readable instructions 332 of FIG. 3) to ensure improvements, patches, updates, etc., are distributed and applied to the software at the end user devices.

From the foregoing, it will be appreciated that example systems, methods, apparatus, and articles of manufacture have been disclosed that prevent dryout of heat pipes. Disclosed systems, methods, apparatus, and articles of manufacture improve the efficiency of using a computing device by prolonging useful life of heat pipes, preventing heat pipe dryout, preventing heat pipes for effectively operating as insulators, and enhancing or otherwise improving thermal solutions of electronic devices. Disclosed systems, methods, apparatus, and articles of manufacture are accordingly directed to one or more improvement(s) in the operation of a machine such as a computer or other electronic and/or mechanical device.

Systems of electronic devices are typically designed to operate at the lowest temperature possible, even when the CPU is at low powers (i.e., during idle duration). This is important not only for the system thermals but also for the battery life as less idle power leads to more battery life. Intuitively, it makes sense to have the CPU at the lowest temperature as possible all the time. However, this design philosophy may be detrimental to the heat pipe performance for at least the reasons explained above.

Examples are disclosed herein that prevent heat pipe dryout. Example 1 includes an apparatus that includes: at least one memory; machine readable instructions; and processor circuitry to at least one of instantiate or execute the machine readable instructions to: determine if a temperature of a heat pipe of an electronic device is below a first threshold temperature; cause a program to switch from a first operating mode to a second operating mode when the temperature is below the first threshold temperature, the second operating mode to use more processor circuitry bandwidth than the first operating mode; determine at least one of (1) an occurrence of an increase in a power level of the electronic device or (2) the temperature of the heat pipe satisfies a second threshold temperature; and cause the program to switch from the second operating mode to the first operating mode based on at least one of (1) the occurrence of the increase in the power level or (2) the temperature of the heat pipe satisfying the second threshold temperature.

Example 2 includes the apparatus of Example 1, wherein the program is a first program and the processor circuitry is to cause a second program to operate when the temperature is below the first threshold temperature.

Example 3 includes the apparatus of Examples 1 and/or 2, wherein the processor circuitry is to cause the first program and the second program to operate simultaneously.

Example 4 includes the apparatus of any of Examples 1-3, wherein the program is a background process of an operating system of the electronic device.

Example 5 includes the apparatus of any of Examples 1-4, wherein the program is a synthetic process independent of an operating system of the electronic device.

Example 6 includes the apparatus of any of Examples 1-5, wherein the processor circuitry is to cause a decrease in a speed of a fan when the temperature is below the first threshold temperature.

Example 7 includes the apparatus of Example 6, wherein the processor circuitry is to cause an increase in the speed of the fan based on at least one of (1) the occurrence of the increase in the power level or (2) the temperature of the heat pipe satisfying the second threshold temperature.

Example 8 includes the apparatus of any of Examples 1-7, wherein the processor circuitry is to detect a connection to an external power source and implement the priming workload based on the connection to the external power source.

Example 9 includes the apparatus of any of Examples 1-8, wherein the first threshold temperature and the second threshold temperature are based on a type of liquid in the heat pipe.

Example 10 includes the apparatus of any of Examples 1-9, wherein the first threshold temperature and the second threshold temperature are based on an amount of liquid in the heat pipe.

Example 11 includes the apparatus of any of Examples 1-10, wherein the first threshold temperature is less than the second threshold temperature.

Example 12 includes the apparatus of any of Examples 1-11, wherein the first threshold temperature and the second threshold temperature differ by about 10 degrees Celsius.

Example 13 includes the apparatus of any of Examples 1-12, wherein the increase in the power level corresponds to a turbo boost.

Example 14 includes the apparatus of any of Examples 1-13, wherein the processor circuitry is to: determine an operating state of a central processing unit of the electronic device; and implement the priming workload when the operating state is idle.

Example 15 includes the apparatus of any of Examples 1-14, wherein the processor circuitry is to select the program based on a power usage of the program to cause the temperature to meet the second threshold temperature within a threshold time period.

Example 16 includes a non-transitory machine readable storage medium that includes instructions that, when executed, cause processor circuitry to at least: cause a program to increase processor circuitry bandwidth consumption when the temperature is below the first threshold temperature; and cause the program to decrease processor circuitry bandwidth consumption based on the temperature of the heat pipe satisfying a second threshold temperature.

Example 17 includes the storage medium of Example 16, wherein the program is a first program and the instructions cause the processor circuitry to operate a second program when the temperature is below the first threshold temperature.

Example 18 includes the storage medium of Examples 16 and/or 17, wherein the program is a background process of an operating system of the electronic device.

Example 19 includes the storage medium of any of Examples 16-18, wherein the instructions cause the processor circuitry to decrease a speed of a fan when the temperature is below the first threshold temperature.

Example 20 includes the storage medium of any of Examples 16-19, wherein the instructions cause the processor circuitry to increase the speed of the fan based on the temperature of the heat pipe satisfying the second threshold temperature.

Example 21 includes an apparatus that includes means for determining a temperature of a heat pipe of an electronic device; means for determining a power level of the electronic device; and means for implementing a priming workload, the means for implementing to: cause a program to operate when the temperature of the heat pipe is below a first threshold temperature; determine at least one of (1) an occurrence of an increase in the power level of the electronic device or (2) the temperature of the heat pipe meets a second threshold temperature; and cause the program to stop based on at least one of (1) the occurrence of the increase in the power level or (2) the temperature of the heat pipe meeting the second threshold temperature.

Example 22 includes the apparatus of Example 21, wherein the means for implementing is to cause a decrease in a speed of a fan when the temperature is below the first threshold temperature.

Example 23 includes the apparatus of Examples 21 and/or 22, wherein the means for implementing is to cause an increase in the speed of the fan based on at least one of (1) the occurrence of the increase in the power level or (2) the temperature of the heat pipe satisfying the second threshold temperature.

Example 24 includes the apparatus of any of Examples 21-23, wherein the means for implementing is to select the program based on a power usage of the program to cause the temperature to meet the second threshold temperature within a threshold time period.

Example 25 includes a method for preventing heat pipe dryout, the method including determining, by executing instructions with a processor, if a temperature of a heat pipe of an electronic device is below a first threshold temperature; operating a processor-implemented program when the temperature is below the first threshold temperature; determining, by executing instructions with the processor, at least one of (1) an occurrence of a power boost event of the processor or (2) the temperature of the heat pipe satisfying a second threshold temperature; and stopping the processor-implemented program based on at least one of (1) the occurrence of the power boost event or (2) the temperature of the heat pipe satisfying the second threshold temperature.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   machine readable instructions; and
   processor circuitry to at least one of instantiate or execute the machine readable instructions to:
      determine if a temperature of a heat pipe of an electronic device is below a first threshold temperature;
      cause a program to switch from a first operating mode to a second operating mode when the temperature is below the first threshold temperature, the second operating mode to use more processor circuitry bandwidth than the first operating mode;
      determine at least one of (1) an occurrence of an increase in a power level of the electronic device or (2) the temperature of the heat pipe satisfies a second threshold temperature; and
      cause the program to switch from the second operating mode to the first operating mode based on at least one of (1) the occurrence of the increase in the power level or (2) the temperature of the heat pipe satisfying the second threshold temperature.

2. The apparatus of claim 1, wherein the program is a first program and the processor circuitry is to cause a second program to operate when the temperature is below the first threshold temperature.

3. The apparatus of claim 2, wherein the processor circuitry is to cause the first program and the second program to operate simultaneously.

4. The apparatus of claim 1, wherein the program is a background process of an operating system of the electronic device.

5. The apparatus of claim 1, wherein the program is a synthetic process independent of an operating system of the electronic device.

6. The apparatus of claim 1, wherein the processor circuitry is to cause a decrease in a speed of a fan when the temperature is below the first threshold temperature.

7. The apparatus of claim 6, wherein the processor circuitry is to cause an increase in the speed of the fan based on at least one of (1) the occurrence of the increase in the power level or (2) the temperature of the heat pipe satisfying the second threshold temperature.

8. The apparatus of claim 1, wherein the processor circuitry is to detect a connection to an external power source and implement the priming workload based on the connection to the external power source.

9. The apparatus of claim 1, wherein the first threshold temperature and the second threshold temperature are based on a type of liquid in the heat pipe.

10. The apparatus of claim 1, wherein the first threshold temperature and the second threshold temperature are based on an amount of liquid in the heat pipe.

11. The apparatus of claim 1, wherein the first threshold temperature and the second threshold temperature differ by about 10 degrees Celsius.

12. The apparatus of claim 1, wherein the increase in the power level corresponds to a turbo boost.

13. The apparatus of claim 1, wherein the processor circuitry is to:
   determine an operating state of a central processing unit of the electronic device; and
   implement the priming workload when the operating state is idle.

14. The apparatus of claim 1, wherein the processor circuitry is to select the program based on a power usage of the program to cause the temperature to meet the second threshold temperature within a threshold time period.

15. A non-transitory machine readable storage medium comprising instructions that, when executed, cause processor circuitry to at least:
   cause a program to increase processor circuitry bandwidth consumption when the temperature is below the first threshold temperature; and
   cause the program to decrease processor circuitry bandwidth consumption based on the temperature of the heat pipe satisfying a second threshold temperature.

16. The storage medium of claim 15, wherein the program is a first program and the instructions cause the processor circuitry to operate a second program when the temperature is below the first threshold temperature.

17. The storage medium of claim 15, wherein the program is a background process of an operating system of the electronic device.

18. The storage medium of claim 15, wherein the instructions cause the processor circuitry to decrease a speed of a fan when the temperature is below the first threshold temperature.

19. The storage medium of claim 18, wherein the instructions cause the processor circuitry to increase the speed of the fan based on the temperature of the heat pipe satisfying the second threshold temperature.

20. An apparatus comprising:
   means for determining a temperature of a heat pipe of an electronic device;
   means for determining a power level of the electronic device; and
   means for implementing a priming workload, the means for implementing to:
      cause a program to operate when the temperature of the heat pipe is below a first threshold temperature;
      determine at least one of (1) an occurrence of an increase in the power level of the electronic device or (2) the temperature of the heat pipe meets a second threshold temperature; and
      cause the program to stop based on at least one of (1) the occurrence of the increase in the power level or (2) the temperature of the heat pipe meeting the second threshold temperature.

21. The apparatus of claim 20, wherein the program includes a decrease in a speed of a fan.

22. The apparatus of claim 20, wherein the means for implementing is to cause an increase in the speed of the fan based on at least one of (1) the occurrence of the increase in the power level or (2) the temperature of the heat pipe satisfying the second threshold temperature.

23. The apparatus of claim 20, wherein the means for implementing is to select the program based on a power usage of the program to cause the temperature to meet the second threshold temperature within a threshold time period.

24. A method for preventing heat pipe dryout, the method comprising:
   determining, by executing instructions with a processor, if a temperature of a heat pipe of an electronic device is below a first threshold temperature;
   operating a processor-implemented program when the temperature is below the first threshold temperature;
   determining, by executing instructions with the processor, at least one of (1) an occurrence of a power boost event of the processor or (2) the temperature of the heat pipe satisfying a second threshold temperature; and stopping the processor-implemented program based on at least one of (1) the occurrence of the power boost event or (2) the temperature of the heat pipe satisfying the second threshold temperature.

* * * * *